US008892269B2

(12) United States Patent
Shrall et al.

(10) Patent No.: US 8,892,269 B2
(45) Date of Patent: Nov. 18, 2014

(54) POWER DOWN AND QUICK START OF THERMAL SENSOR

(75) Inventors: Jeremy J. Shrall, Portland, OR (US); Alvin Shing Chve Goh, Penang (MY); Takao Oshita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 13/436,681

(22) Filed: Mar. 30, 2012

(65) Prior Publication Data

US 2013/0261814 A1 Oct. 3, 2013

(51) Int. Cl.
*G05D 23/00* (2006.01)
*G06F 1/26* (2006.01)

(52) U.S. Cl.
USPC .......................................... 700/299; 713/320

(58) Field of Classification Search
None
See application file for complete search history.

(56) References Cited

U.S. PATENT DOCUMENTS 8,185,083 B2 * 5/2012 Babitch et al. ............. 455/343.1
2013/0290758 A1 * 10/2013 Quick et al. .................. 713/323

* cited by examiner

*Primary Examiner* — Ryan Jarrett
(74) *Attorney, Agent, or Firm* — Blakely, Sokoloff, Taylor & Zafman LLP

(57) ABSTRACT

A thermal sensor is placed in a low power state. When the sensor is triggered to wake from the low power state, it initiates a thermal sensor scan from the sensor value measured prior to the low power state. The thermal sensor initially adjusts the measured value with a fast count by a configurable adjustment of greater than 1, and after reaching an inflection point performs normal count by adjustments of 1.

21 Claims, 14 Drawing Sheets

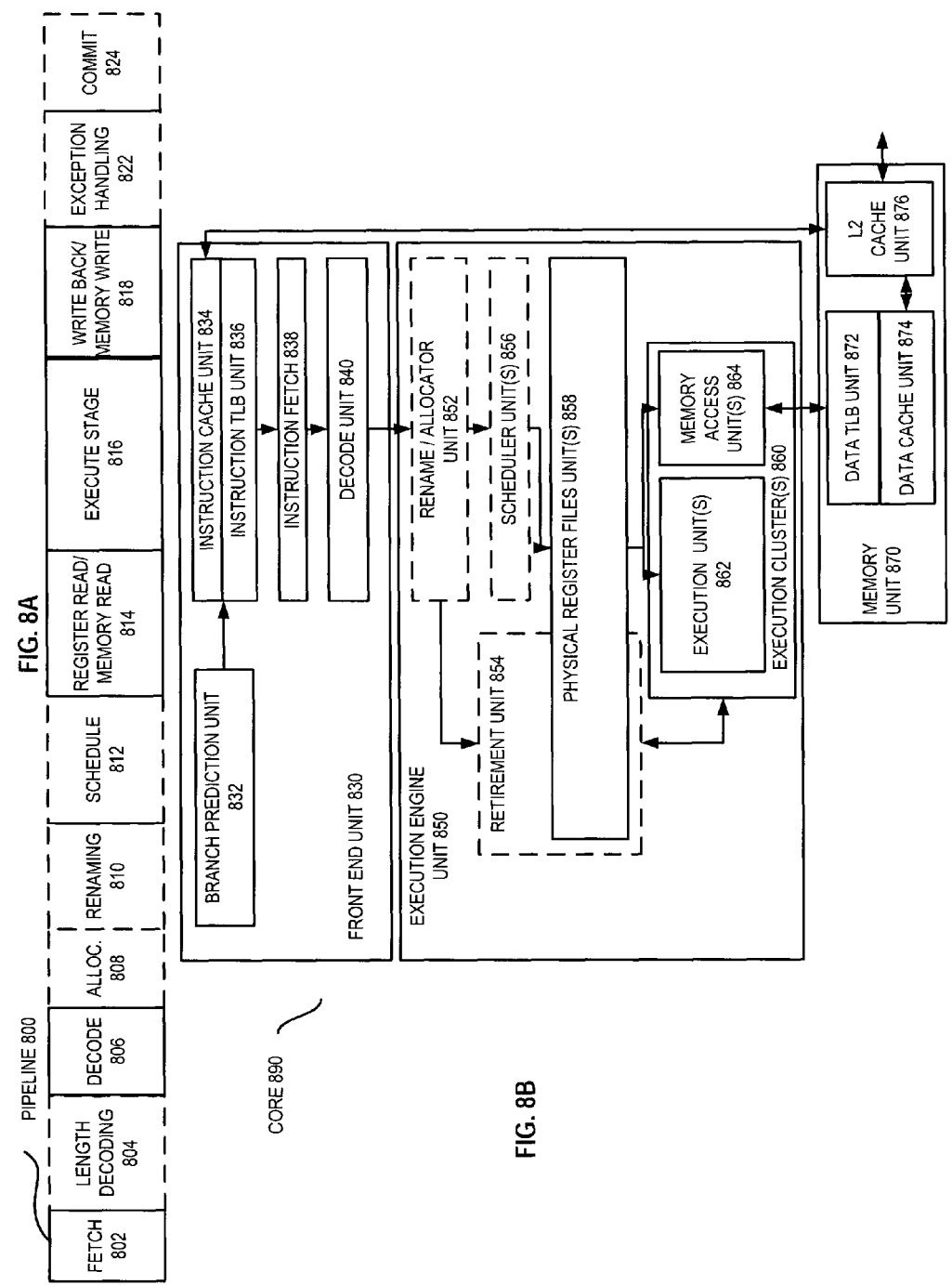

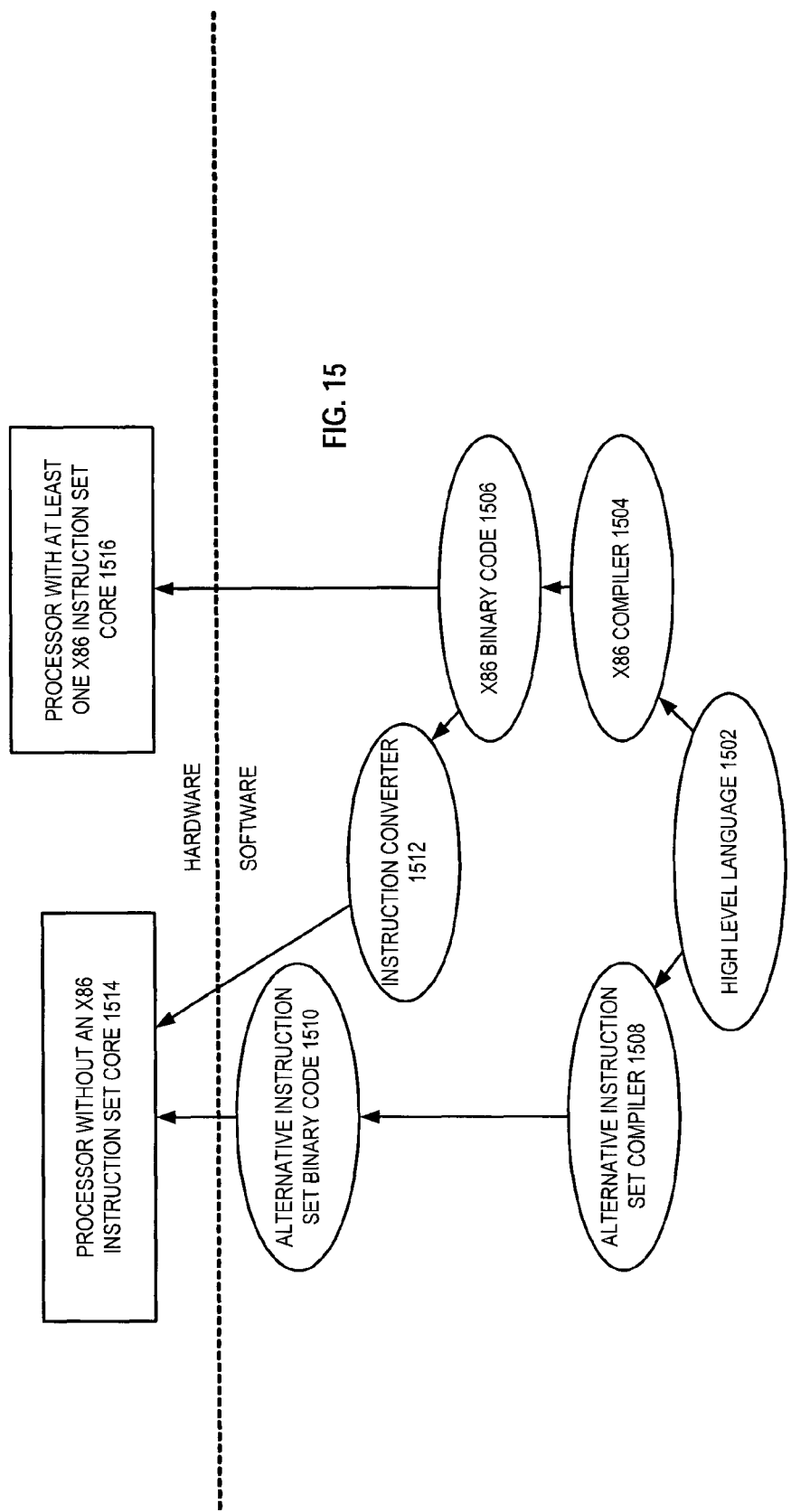

POWER DOWN AND QUICK START OF THERMAL SENSOR

FIELD

Embodiments of the invention are generally related to power management, and more particularly to shutting down a thermal sensor.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, Intel Corporation, All Rights Reserved.

BACKGROUND

Power consumption of thermal sensors in some current processing systems is a significant component of idle power during low power operations. For example, in deepest package C-states, thermal sensor power consumption is significant, and on some products, thermal sensor power consumption during active may even significantly impact power consumption at maximum frequencies. Thermal sensors are typically left running even in idle states, even though the data is not required during idle states when most of the CPU is powered off.

Thermal sensors are typically left running because they take a relatively long time to scan. In traditional systems, a thermal sensor would need to rescan the temperature(s) from scratch upon exit from a low power state. Current thermal sensor design is an up/down counter that steps one code per 640 ns. With a resolution of 9 bits, maximum scan time can be as high as 2^9*640 ns or 327 us. In some traditional systems, the active time in idle scenarios is <100 us, which means that with such a long scan the system could never achieve a full scan before re-entering the low power state. Thermal telemetry (and control) would potentially lag real conditions indefinitely unless the thermal sensors remain active to keep a valid reading.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 8A is a block diagram illustrating an embodiment of both an exemplary in-order pipeline and an exemplary register renaming, out-of-order issue/execution pipeline.

FIG. 8B is a block diagram illustrating an embodiment of both an exemplary embodiment of an in-order architecture core and an exemplary register renaming, out-of-order issue/execution architecture core to be included in a processor.

FIG. 15 is a block diagram of one embodiment contrasting the use of a software instruction converter to convert binary instructions in a source instruction set to binary instructions in a target instruction set.

Figure 1:
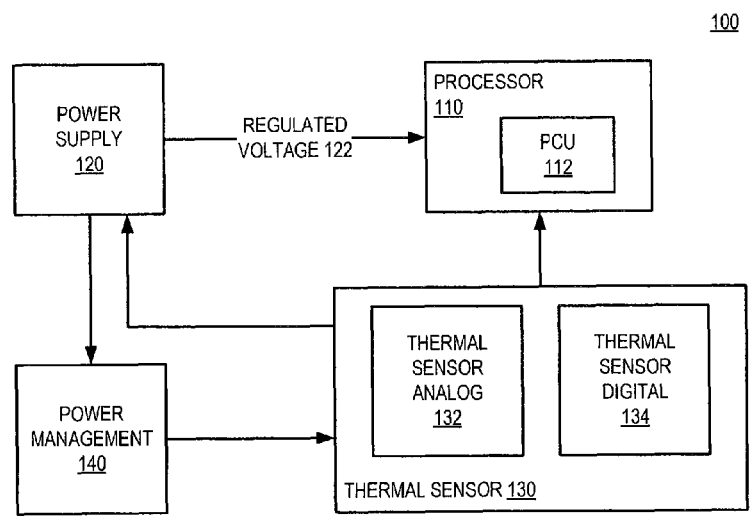
FIG. 1 is a block diagram of an embodiment of a system having a thermal sensor that can be selectively shut down.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a thermal sensor is placed in a low power state. When the sensor is triggered to wake from the low power state, it initiates a thermal sensor scan from the sensor value measured prior to the low power state. The thermal sensor initially adjusts the measured value with a fast count by a configurable adjustment of greater than 1, and after reaching an inflection point performs normal count by adjustments of 1. The logic of the thermal sensor can be separated to have some portions powered down in the low power state, while other portions can remain powered. Thus, the thermal sensor can be powered down in a low power state of the processor.

The thermal sensor uses the fast count and the normal count sequences to adjust the measured value toward a target value. The target value can be a current actual temperature of the system monitored by the thermal sensor. The value adjustments will be up when the stored value is lower than a current temperature, and down when the stored value is higher than the current temperature. Thus, adjusting the value can refer to either incrementing or decrementing the value. The course adjustments (adjustments of n, where n is an integer greater than 1) start up or down depending on whether the stored value is too high or too low. In one embodiment, the starting direction is determined by reading a comparator that indicates whether the value is too high or too low.

It will be understood that as described herein, thermal sensor temperature scan can start from a last-known state, rather than initializing a new scan. The time anticipated to adjust the last known temperature state is much less than initiating a new scan. The temperature of the system is anticipated to be fairly stable over the period of microseconds or milliseconds between scans. Thus, starting at the last-known state should be relatively close to the current temperature.

With the quick ramp-up to the current temperature value when the thermal sensor comes out of the low power state, the thermal data can be quickly and regularly refreshed. Since voltage control is a function of temperature, up-to-date thermal data can enable the system to reduce thermal-based voltage guardbands, and as a result minimize power consumption during mostly idle conditions.

The thermal sensor can thus be safely shut down and allow providing accurate temperature readings with a short latency by introducing a fast wake up temperature scanning mechanism. In one embodiment, the thermal sensor analog circuits (which can include a voltage regulator and DAC (digital-to-analog converter) are shut down during low power mode.

FIG. 1 is a block diagram of an embodiment of a system having a thermal sensor that can be selectively shut down. System 100 includes processor 110, which is powered by power supply 120. Power supply 120 provides regulated voltage 122 to processor 110. The regulated voltage is temperature sensitive. To make system 100 more energy efficient, the system can monitor temperature variations and account for them in power management decisions with respect to the operation of processor 110.

Thermal sensor 130 monitors the thermal environment of system 100. In traditional systems, thermal sensor 130 is always on monitoring the temperature. In systems where low power operation is desired, processor 110 enters low power modes (e.g., low power C-states), especially during idle periods. PCU (power control unit) 112 is a power manager on processor 110 that determines when to put processor 110 in a low power state, and makes other power management decisions with respect to voltages and peripheral management in system 100. In one embodiment, PCU 112 is triggered when software or firmware executing in system 100 indicates that processor 110 should be powered down to a low power (sleep) state. PCU 112 initiates the power down process.

As described herein, part of the power down includes putting thermal sensor 130 in a low power state. Thermal sensor 130 can power down and power up smoothly while maintaining valid temperature readings, meaning the powering down does not negatively impact the performance of the PCU in determining wake voltages for processor 110 (or its cores in the case of a multi-core processor). Processor 110 could remain in a sleep state until a request for an operation brings it out of the low power state. One reason processor 110 could wake is to service a snoop. It will be understood that the latency associated with ramping up to service the snoop is much shorter than traditional thermal scan initialization. However, a thermal sensor according to any embodiment described herein can provide thermal reading on par with the latency associated with short wake times, such as for servicing a snoop.

In one embodiment, thermal sensor 130 includes thermal sensor analog components 132 and thermal sensor digital components 134. Separating the thermal sensor hardware logic into analog 132 and digital 134 can provide an advantage in power savings. Analog components 132 can be completely shut down in low power mode, where at least some digital components 134 need to be powered in low power mode to maintain state. Maintaining state can enable thermal sensor 130 to shut down, but then wake up and begin providing thermal sensor functions with a low enough latency to justify the powering down.

Power management 140 represents hardware that manages the placing of thermal sensor 130 into a low power state. For example, different voltage levels will be needed for components that are turned off versus components that are not turned off. Aspects of power management 140 are described in more detail below with respect to FIGS. 2 and 3. In one embodiment, power management 140 is part of PCU 112.

Figure 2:
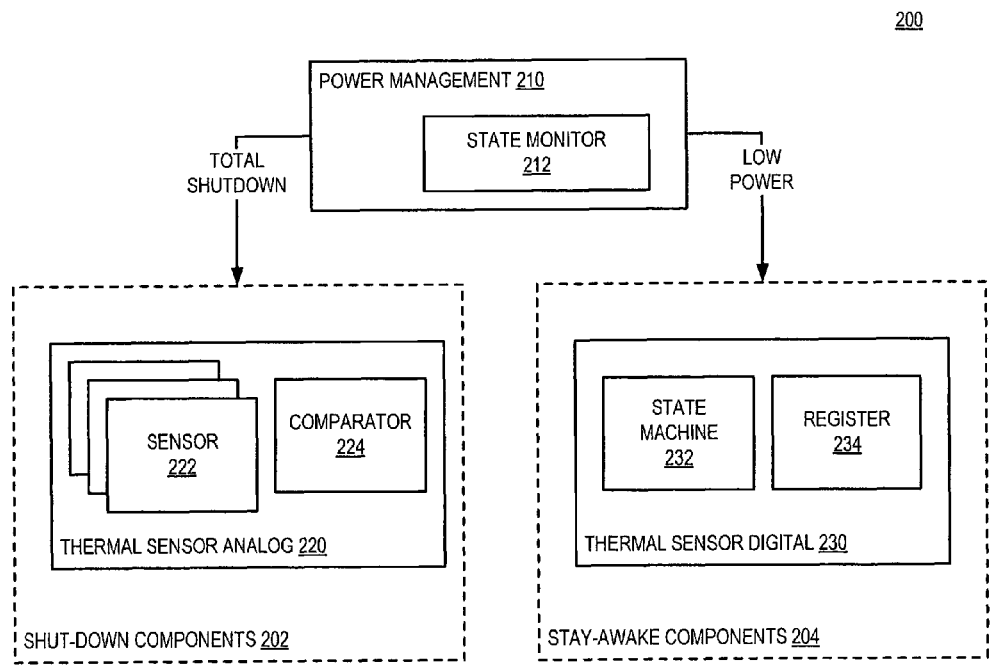
FIG. 2 is a block diagram of an embodiment of a system having a thermal sensor separated into components that can be powered down and those that remain powered in a low power state.

FIG. 2 is a block diagram of an embodiment of a system having a thermal sensor separated into components that can be powered down and those that remain powered in a low power state. In one embodiment, system 200 is an example of system 100. System 200 illustrates the thermal sensor as separate components, thermal sensor analog 220 and thermal sensor digital 230. As illustrated, thermal sensor analog components 220 are included in shut-down components 202, which thermal sensor digital components 230 are included in stay-awake components 204. In one embodiment, all digital control logic of the thermal sensor will be on an "always ON" power supply. In one embodiment, a digital component could be included in shut-down components 202.

The voltage regulator (VR) for the thermal sensor needs to support shutdown or standby mode. All components that stay awake will need to continue to be powered by the VR, while power needs to be switched off for components that will be powered off in low power mode. There could be separate VRs powering shut-down components 202 and stay-awake components 204. Alternatively, in one embodiment, instead of having the VR support the shutdown, power management 210 could include power switch logic to control the powering down of some components, while leaving the others powered.

In one embodiment, thermal sensor analog components 220 include one or more sensors 222 (e.g., one for each core) and comparator 224. Sensors 222 perform the actual monitoring and reading of the temperature. Comparator 224 can include hardware to indicate if the start of a temperature scan should be up or down. In one embodiment, comparator 224 includes a monitor for a P/N junction voltage, which is strongly temperature dependent. Reading the P/N junction voltage allows comparator 224 to indicate whether stored value of temperature is higher or lower than the value determined by measurement.

In one embodiment, thermal sensor digital components 230 include register 234 or other memory devices to store a value for the temperature. Reference to a known-good state, or a stored value, or a measured state all refer to the value stored in register 234. The thermal sensor stores its last known value of the temperature in register 234 for later use as a starting point for a thermal scan.

In one embodiment, thermal sensor digital 230 includes state machine 232, which is a finite state machine (FSM) that allows the thermal sensor to perform its functions, including a quick ramp-up out of low power mode. An example of an embodiment of a state machine is provided in FIG. 4A below. The example of FIG. 4A can be one embodiment of state machine 232.

System 200 includes power management 210, which can be part of a PCU of a processor associated with the thermal sensor. Power management 210 can indicate total shutdown of shut-down components 202, and continue powering stay-awake components 204 during low power mode. In regular operation, both components 202 and 204 can operate at the same power. State monitor 212 allows power management 210 to coordinate operations of the thermal sensor, including entering into and exiting from low power. An example operation of the thermal sensor is provided below.

The thermal sensor is to retain its current temperature codes prior to power down states by using register(s) 234 which is powered by an "always ON" supply. The thermal sensor analog DAC circuit(s) (e.g., sensor 222) is powered by a regulated supply (e.g., VCCTHM), which can be shut down during package C-states.

Upon package C-state exit, the first scan of temperature begins with the previously retained code. The thermal sensor accesses register 234 to obtain the starting point of the scan. The initial temperature scanning will be a fast and coarse scan where the codes are incremented or decremented at a programmable step larger than 1.

Once an inflection on the direction of the code is detected by the thermal sensor, the temperature codes can revert to a normal operation of +/−1 code fine scan. In one embodiment, once the direction of the code dithers at up-down-up or down-up-down, the digital control logic of the thermal sensor can issue a ThermalCodeValid bit to a PCU, which can include power management 210. In one embodiment, the PCU identifies the ThermalCodeValid bit as an indication that the PCU can safely consume and rely on the temperature codes produced by the thermal sensor.

In one embodiment, the PCU observes a rising edge on the valid bit for each core thermal sensors and creates a 'fast path' event to handle thermal sensor updates. Fast path events are a pcode scheduling concept that allows the system to respond to critical updates within 1 us latency. In one embodiment, the fast path event can be executed in parallel with normal pcode wake flow. Thus, temperatures are expected to be valid in advance of calculating wake voltages for IA core domains. IA core and graphics domains both have voltage controlled as a function of temperature so having up-to-date readings allows the system to minimize voltage guardbands during active operation.

Figure 3:
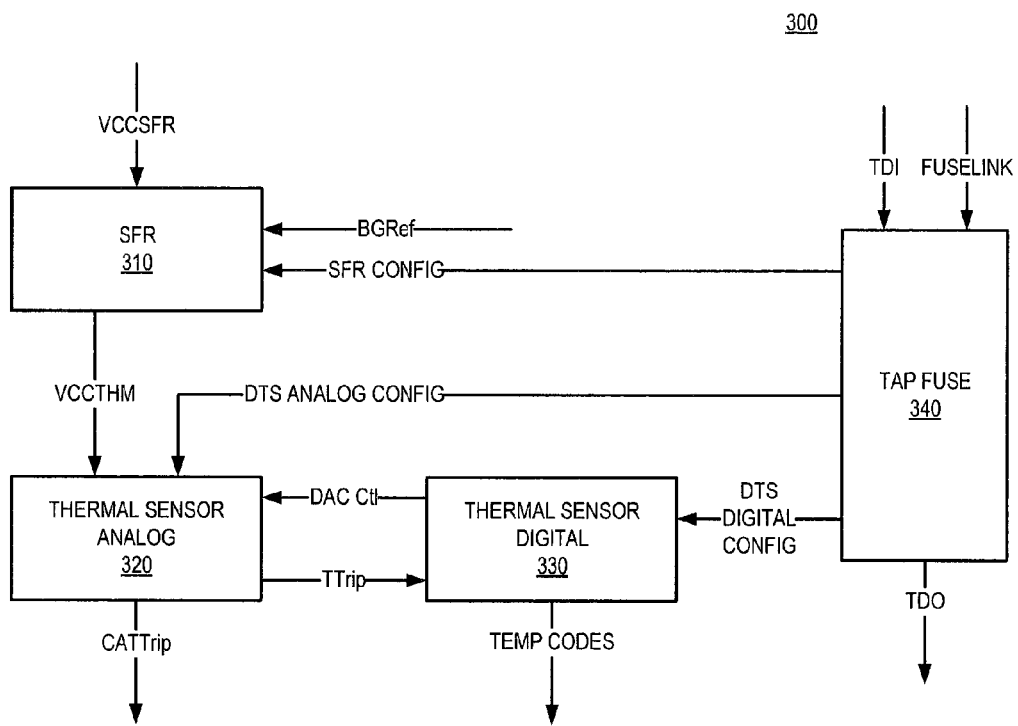
FIG. 3 is a block diagram of an embodiment of a system having a thermal sensor separated into analog components that are shut down in a low power state, and digital components that remain powered in the low power state.

FIG. 3 is a block diagram of an embodiment of a system having a thermal sensor separated into analog components that are shut down in a low power state, and digital components that remain powered in the low power state. System 300 is one embodiment of a thermal sense block in accordance with any embodiment described herein.

System 300 includes thermal sensor analog components 320 and thermal sensor digital components 330. For purposes of discussion here, it will be assumed that analog components 320 include all components of the thermal sensor that can be powered down during a low power state, and digital components 330 include all components of the thermal sensor that are to be maintained powered on during a low power state.

The power to digital components 330 is not shown, as it is understood to be always powered. Analog components 320 are powered by SFR (super filter regulator) 310 with VCCTHM (thermal component voltage). SFR 310 is powered by VCCSFR, which can be selectively turned off. Thus, SFR 310 and the analog core 320 can be totally shut down. In one embodiment, the clocks to digital core 330 are gated during package C-states.

In one embodiment, SFR 310 receives one or more reference signals, such as BGRef, as references in providing power to the analog components. In one embodiment, SFR 310 is configured by one or more values stored in TAP fuse 340. Additionally, TAP fuse 340 can provide configuration for analog components 320 and 330. TAP fuse 340 can receive inputs and provide outputs (TDI and TDO, respectively). The fuselink allows the system to program TAP fuse 340.

In one embodiment, digital components 330 provide a control signal (DAC Ctl) for a DAC of analog components 320. Analog components 320 can provide an indication of when the thermal scan passes the target temperature and triggers an inflection point. Analog components 320 can provide a trigger indication (CATTrip) to a component outside of system 300. Digital components 330 provide temperature codes to be consumed by the PCU.

Figure 4A:
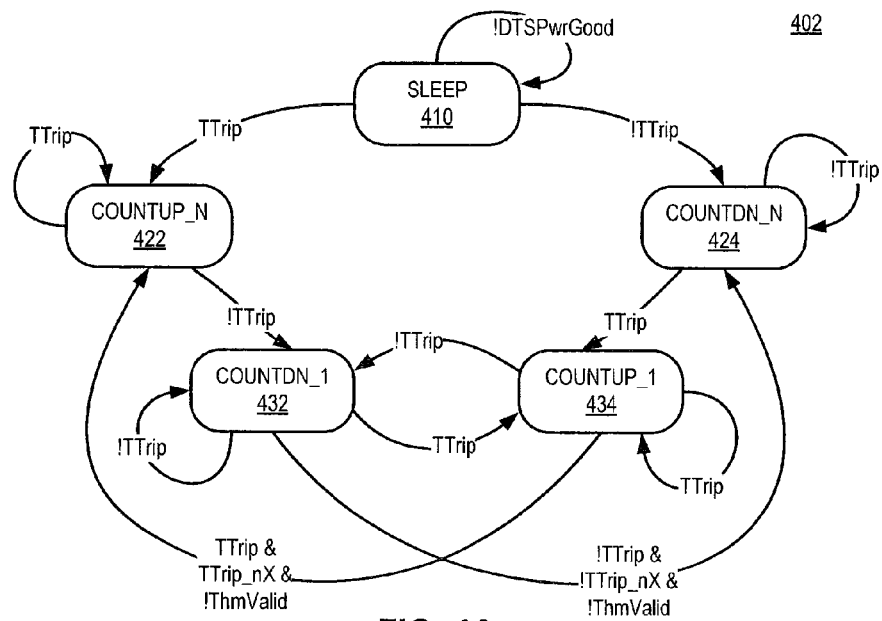
FIGS. 4A-B are block diagrams of embodiments of a state machine for a thermal sensor to wake from a low power state.
Figure 4B:
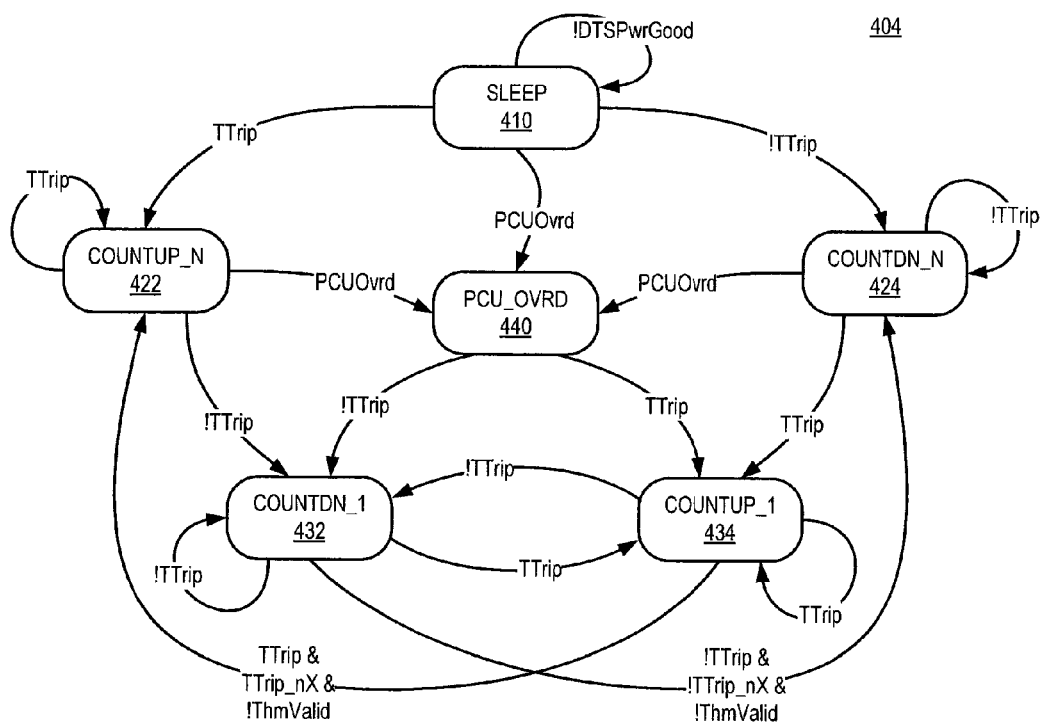

FIGS. 4A-B are block diagrams of embodiments of a state machine for a thermal sensor to wake from a low power state. FIG. 4A illustrates state machine 402, and FIG. 4B illustrates state machine 404. State machine 404 differs from state machine 402 in including PCU_Ovrd 440.

Thermal sensor temperature scan FSM 402 goes into SLEEP 410 whenever DTSPwrgood is disserted. At this stage, the temperature codes which were previously sent out to the PCU are retained. When the thermal sensor exits the low power states (e.g., C6/C7), the FSM goes to COUNTUP_N 422 or COUNTDN_N 424. The FSM exits SLEEP 410 to COUNTUP_N 422 when the comparison of the current measurement value (Trip) indicates the reading is too low. The FSM exits SLEEP 410 to COUNTDN_N 424 when the comparison of the current measurement value (!TTrip) indicates the reading is too high.

Both COUNTUP_N 422 and COUNTDN_N 424 can be referred to as fast count states. The value of n is the number of steps to increment/decrement for each thermal code countup/countdn. The value is configurable. In one embodiment the value ranges from 1 to 4 and is configurable from Fuselink or TAP. Other values can be used. The fast count feature can be bypassed by setting n=1. A value of n=4 can enable the system to meet an exit latency of 10 us with a POR thermal scan clock frequency of 1.5625 MHz.

When the FSM is in a fast count state, it will continuously count fast for nSTEP until it sees an inverse polarity (!TTrip from COUNTUP_N 422, and TTrip from COUNTDN_N 424). The FSM moves from COUNTUP_N 422 to COUNTDN_1 432, or from COUNTDN_N 424 to COUNTUP_1 434. These transitions are transitions from fast count to normal count.

Moving to the normal count states usually is a sign that the system is close to the target (e.g., actual) temperature value being measured by the thermal sensor. In one embodiment, the thermal sensor is considered to have successfully converged to the valid temperature when the FSM is dithering between COUNTDN_1 432 and COUNTUP_1 434. The FSM transitions between the two normal count states when an inflection point (TTrip and !TTrip) is detected. In one embodiment, a ThermalValid bit is asserted to inform the PCU that the thermal sensor has successfully converged to a valid temperature. In one embodiment, the ThermalValid bit is defined as a detection of an up-down-up-down or down-up-down-up trend for the thermal scan direction.

In one embodiment, the FSM includes a mechanism to transition back to a fast count from normal count if the scan is not converging. The FSM can transition from COUNTDN_1 432 to COUNTDN_N 424 when an inflection point has not been tripped (!TTrip-would normally keep the FSM in COUNTDN_1 432) AND has not been tripped for a certain number of cycles (!TTrip_nX) AND there is no valid read (!ThmValid). Similarly, the FSM can transition from COUNTUP_1 434 to COUNTUP_N 422 when an inflection point has not been tripped (TTrip-would normally keep the FSM in COUNTUP_1 434) AND has not been tripped for a certain number of cycles (TTrip_nX) AND there is no valid read (!ThmValid).

Referring to FIG. 4B, FSM 404 includes all states discussed above, and additionally can include PCU_Ovrd 440. PCU_Ovrd state 440 can provide a debugging feature where the PCU can overwrite the temperature for silicon debug purposes only.

Figure 5:
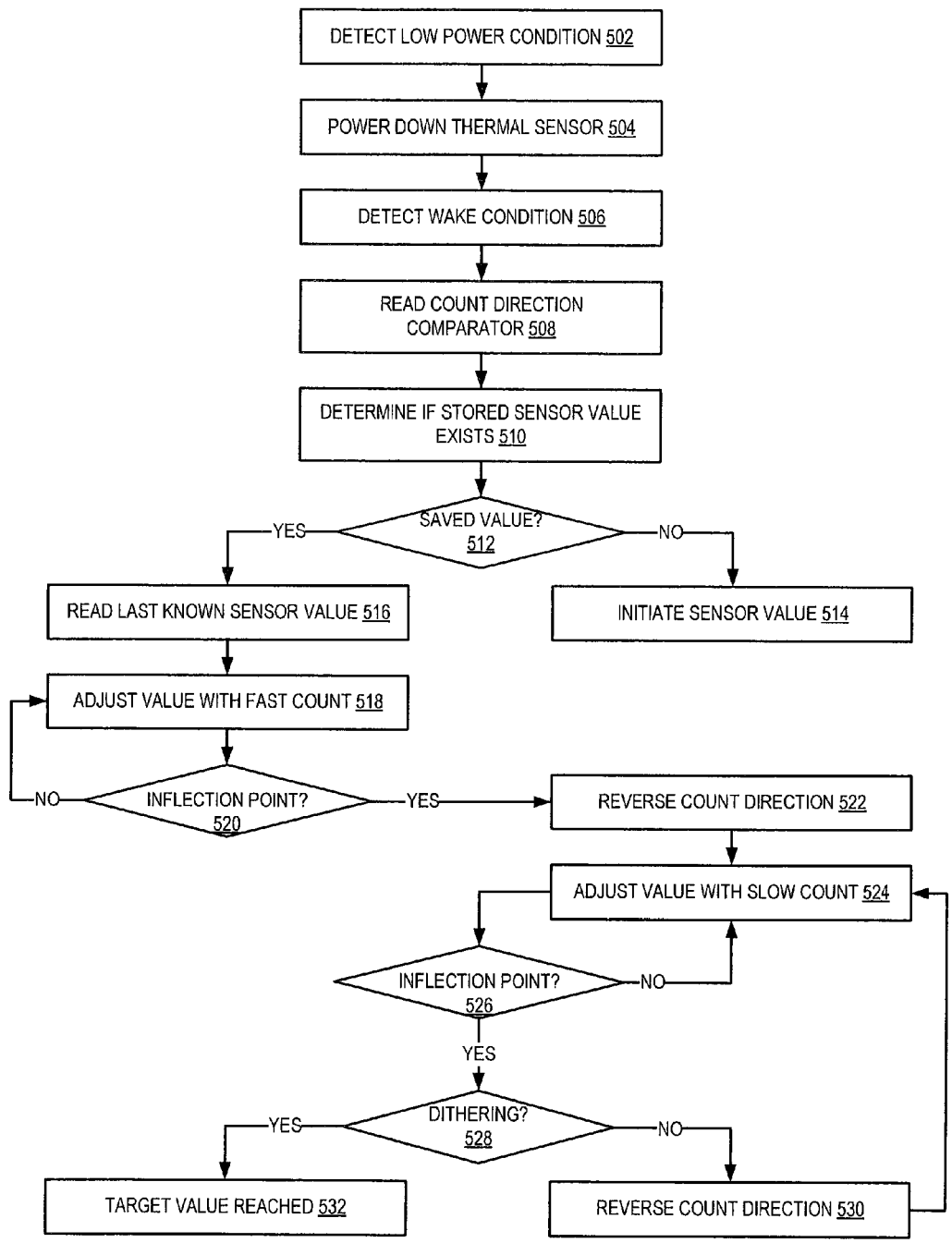
FIG. 5 is a flow diagram of an embodiment of a process for powering down and waking a thermal sensor.

FIG. 5 is a flow diagram of an embodiment of a process for powering down and waking a thermal sensor. In one embodiment, the illustrated flow can be accomplished by a FSM, such as described above. In one embodiment, a system with a thermal sensor detects a low power condition, 502. The PCU can receive an indication that the system should be put in the low power state. As described herein, the system can power down the thermal sensor, 504.

When the PCU determines it is time to wake the thermal sensor back up, the PCU triggers a wake condition for the thermal sensor, 506. In one embodiment, the thermal sensor reads a count direction from a comparator of thermal sensor analog components, 508. The thermal sensor can determine if there is a stored sensor value, 510. If there is no stored sensor value, 512, the thermal sensor initiates a temperature scan to initiate a sensor value, 514.

If there is a saved sensor value, 512, the thermal sensor reads the last known sensor value, 516. The thermal sensor can then perform a scan starting from the last known value. Starting at the stored value, the thermal sensor adjusts the value first with a fast count sequence, 518. In one embodiment, the count will go in a direction indicated by the comparator read. The fast count adjusts (increments or decrements) the count of the value by a value n that is greater than or equal to 1. The thermal sensor continues to adjust the count until there is an inflection point. Thus, if there is no inflection point reached (where an analog comparison indicates the count has passed the target value), 520, the thermal sensor continues fast count, 518.

When an inflection point is reached, 520, the thermal sensor reverses the count direction, 522, and adjusts the value with a slow count or a normal count in the opposite direction, 524. Again, the thermal sensor continues to adjust with the normal count until an inflection point is reached, 526. In one embodiment, at this point the thermal sensor determines whether the scan is dithering, 528. The thermal scan will ideally end dithering around a value. In one embodiment, if the scan is not dithering, 528, the thermal sensor can reverse count direction, 530, and continue to adjust the value with a slow count, 524, attempting to reach a dithering point. In one embodiment, if the count is dithering, 528, the thermal sensor determines it has reached its target value, 532.

Figure 6:
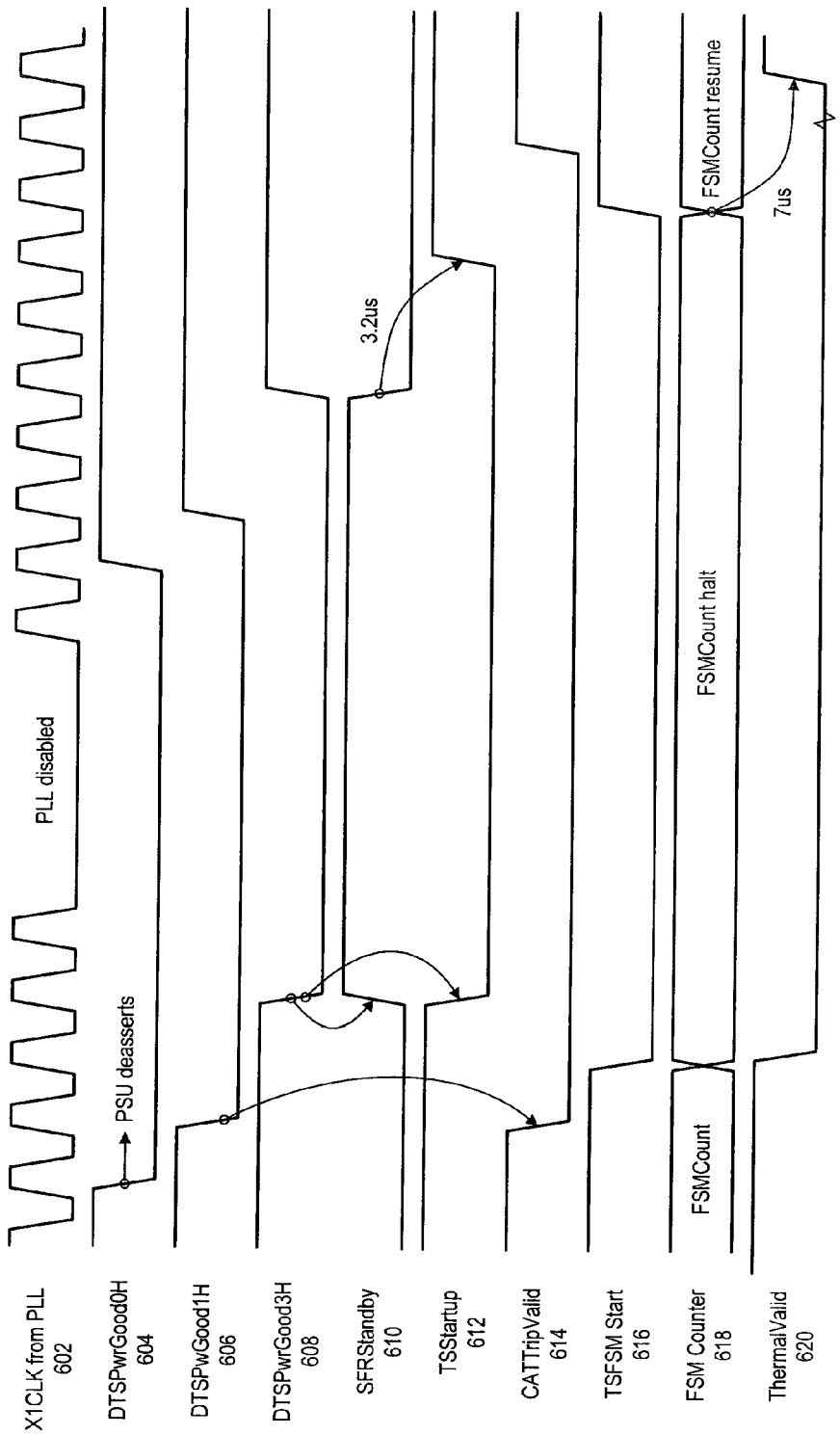
FIG. 6 is an embodiment of a timing diagram for a thermal sensor that is placed in a low power state.

FIG. 6 is an embodiment of a timing diagram for a thermal sensor that is placed in a low power state. In one embodiment, the timing diagram can be considered a package C6/C7 entry and exit diagram. The signal names are merely exemplary, and the diagram provides a non-limiting example. Those of skill in the art will understand the general principles from the examples below described with the convention of the signal names shown.

X1CLK from PLL, signal 602, is a clock signal. In one embodiment, the PLL is coupled to the power supply for the thermal sensor (SFR), and thus will be disabled when the power supply is powered down. The thermal sensor can depend on an indicator signal from the PCU called DTSPwrGood, signal 604, which the PCU deasserts at least 5 cycles prior to package C6/C7 state entry. DTSPwrGood can be staged locally in the thermal sensor and used to put the thermal sensor power supply (SFR) in standby mode. Thus, SFRStandby, signal 610 is shown transitioning 3 clock cycles after the PSU deasserts DTSPwrGood (DTSPwrGood3H, signal 608). DTSPwrGood can also disable the thermal sensor current minor DAC module. When the DTSPwrGood signal is deasserted, the CATTrip output from the Thermal Sensor is gated to not trip. Thus, 1 clock cycle after the PCU deasserts DTSPwrGood (DTSPwrGood1H, signal 606), CATTripValid, signal 614) is transitioned.

Subsequently, the FSM is turned off at the next cycle (two clock cycles after the PCU triggers DTSPwrGood, signal 604). Thus, FSMCounter, signal 618, goes from FSMCount to FSMCount Halt and the thermal sensor FSM start signal (TSFSMStart, signal 616) is transitioned. Additionally, with the thermal sensor not running, there is no valid temperature reading, and the thermal valid signal (ThmValid above, ThermalValid signal 620 in FIG. 6) is transitioned. Another cycle later, the SFR is put in standby mode (SFRStandby, signal 610) and the thermal sensor DAC is shut off (TSStartup, signal 612). The PLL filtered bus clock which is clocking the FSM will also be shut off by the PCU during this state (X1CLK from PLL, signal 602).

The FSM can be on an always ON supply (e.g., VCCIO), meaning the thermal temperature code prior to package C-state will be retained by the counter in the FSM. During exit of C6/C7 states, the clock signal begins to run, and the PCU can assert DTSPwrGood. SFRStandby 610 can be deasserted and VCCTHM (thermal sensor voltage supply) will begin to be generated. In one embodiment, using a counter-based timer, 3.2 us is allocated for VCCTHM to stabilize (see the 3.2 us between SFRStandby, signal 610 transitioning to TSStartup, signal 612 transitioning). The delay can avoid overshoot during the start of the VCCTHM regulation that may cause electrical over stress (EOS) or degrade oxide reliability of the thermal sensor DAC. In one embodiment, the analog DAC is only enabled after the timer expires. Only after that, the FSM counters are started and CATTrip feature is enabled. The temperature of the thermal sensor is scanned beginning with the temperature code prior to C6/7 state entry. This way, the latency to obtain a valid temperature will be shortened. There can be a little more than 3.2 us between the SFRStandby transitioning and FSMCounter resuming. There can be approximately jus between when FSMCounter resumes counting, and the ThermalValid being reached and reasserted.

Figure 7:
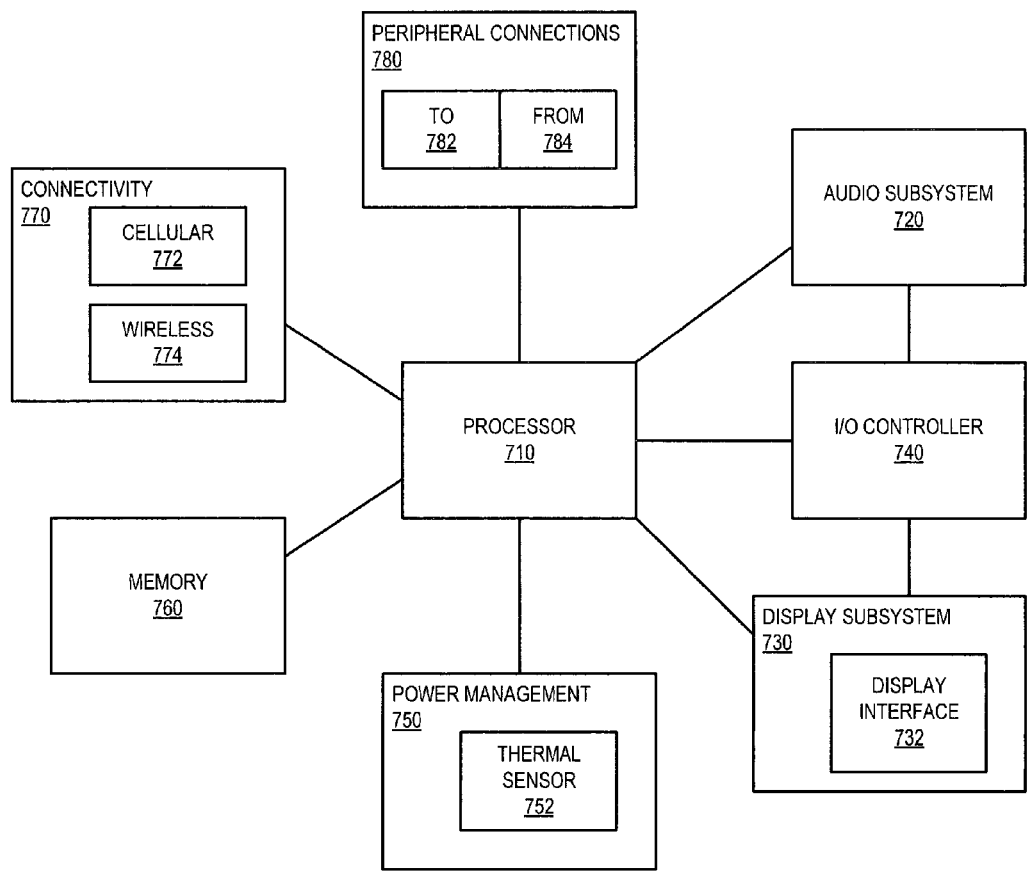
FIG. 7 is a block diagram of an embodiment of a mobile device in which thermal sensor shutdown can be utilized.

FIG. 7 is a block diagram of an embodiment of a mobile device in which thermal sensor shutdown can be utilized. Device 700 represents a mobile computing device, such as a computing tablet, a mobile phone or smartphone, a wireless-enabled e-reader, or other mobile device. It will be understood that certain of the components are shown generally, and not all components of such a device are shown in device 700.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations can also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. In another example, if display subsystem includes a touchscreen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that can be included in device 700. The input can be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation. Memory subsystem 760 includes memory devices for storing information in device 700. Memory 760 can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700.

Connectivity 770 includes hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication (including optical communication) occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, power management 750 includes thermal sensor 752 for at least one processor or processing core of processor 710. Thermal sensor 752 can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

Processor cores can be implemented in different ways, for different purposes, and in different processors. For instance, implementations of such cores can include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors can include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which can include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that can include on the same die the described CPU (sometimes referred to as the application core(s) or application processor(s)), the above described coprocessor, and additional functionality. Exemplary core architectures are described next, followed by descriptions of exemplary processors and computer architectures.

FIG. 8A is a block diagram illustrating an embodiment of both an exemplary in-order pipeline and an exemplary register renaming, out-of-order issue/execution pipeline. FIG. 8B is a block diagram illustrating an embodiment of both an exemplary embodiment of an in-order architecture core and an exemplary register renaming, out-of-order issue/execution architecture core to be included in a processor. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 can be a reduced instruction set computing (RISC) core, a complex instruction set computing (CISC) core, a very long instruction word (VLIW) core, or a hybrid or alternative core type. As yet another option, the core 890 can be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) can decode instructions, and generate as an output one or more micro-operations, micro-code entry points, microinstructions, other instructions, or other control signals, which are decoded from, or which otherwise reflect, or are derived from, the original instructions. The decode unit 840 can be implemented using various different mechanisms. Examples of suitable mechanisms include, but are not limited to, look-up tables, hardware implementations, programmable logic arrays (PLAs), microcode read only memories (ROMs), or other mechanisms. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, or other scheduling mechanism. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), or other data types. In one embodiment, the physical register file(s) unit 858 comprises a vector register unit, a write mask register unit, and a scalar register unit. These register units can provide architectural vector registers, vector mask registers, and general purpose registers. The physical register file(s) unit(s) 858 is overlapped by the retirement unit 854 to illustrate various ways in which register renaming and out-of-order execution can be implemented (e.g., using a reorder buffer(s) and a retirement register file(s); using a future file(s), a history buffer(s), and a retirement register file(s); using a register maps and a pool of registers). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 can perform various operations (e.g., shifts, addition, subtraction, multiplication) and on various types of data (e.g., scalar floating point, packed integer, packed floating point, vector integer, vector floating point). While some embodiments can include a number of execution units dedicated to specific functions or sets of functions, other embodiments can include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each has its own scheduler unit, physical register file(s) unit, and/or execution cluster—and in the case of a separate memory access pipeline, certain embodiments are implemented in which only the execution cluster of this pipeline has the memory access unit(s) 864). It will be understood that where separate pipelines are used, one or more of these pipelines can be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 can include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture can implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units can be involved in the exception handling stage 822; and 8) the retirement unit 854 and the physical register file(s) unit(s) 858 perform the commit stage 824.

The core 890 can support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., including the instruction(s) described herein. In one embodiment, the core 890 includes logic to support a packed data instruction set extension (e.g., AVX1, AVX2), thereby allowing the operations used by many multimedia applications to be performed using packed data.

It will be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it will be understood that register renaming can be used in an in-order architecture. While the illustrated embodiment of the processor also includes separate instruction and data cache units 834/874 and a shared L2 cache unit 876, alternative embodiments can have a single internal cache for both instructions and data, such as, for example, a Level 1 (L1) internal cache, or multiple levels of internal cache. In some embodiments, the system can include a combination of an internal cache and an external cache that is external to the core and/or the processor. Alternatively, all of the cache can be external to the core and/or the processor.

In one embodiment, a thermal sensor for a processor can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

Figure 9B:
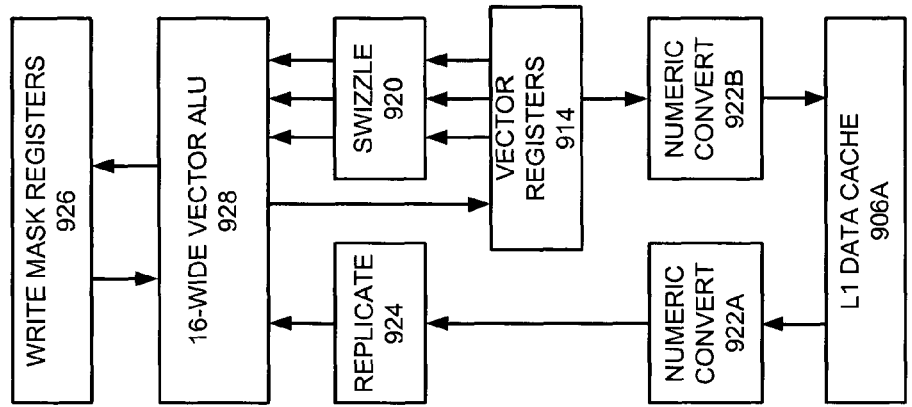
FIGS. 9A-B illustrate a block diagram of a more specific exemplary in-order core architecture, which core would be one of several logic blocks (including other cores of the same type and/or different types) in a chip.
Figure 9A:
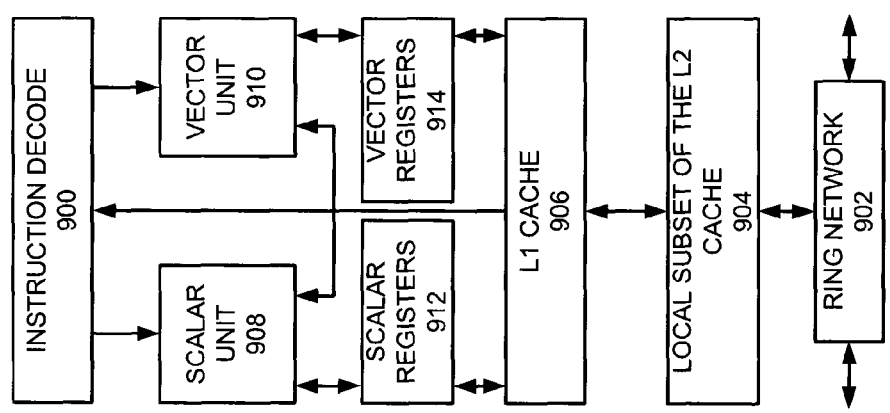

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of an embodiment of a single processor core, along with its connection to the on-die interconnect network 902 and with its local subset of the Level 2 (L2) cache 904. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments can use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches other logic blocks to communicate with each other within the chip. In one embodiment, each ring data-path is 1012-bits wide per direction.

FIG. 9B is an expanded view of one embodiment of part of the processor core in FIG. 9A. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

In one embodiment, a thermal sensor for a processor can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

Figure 10:
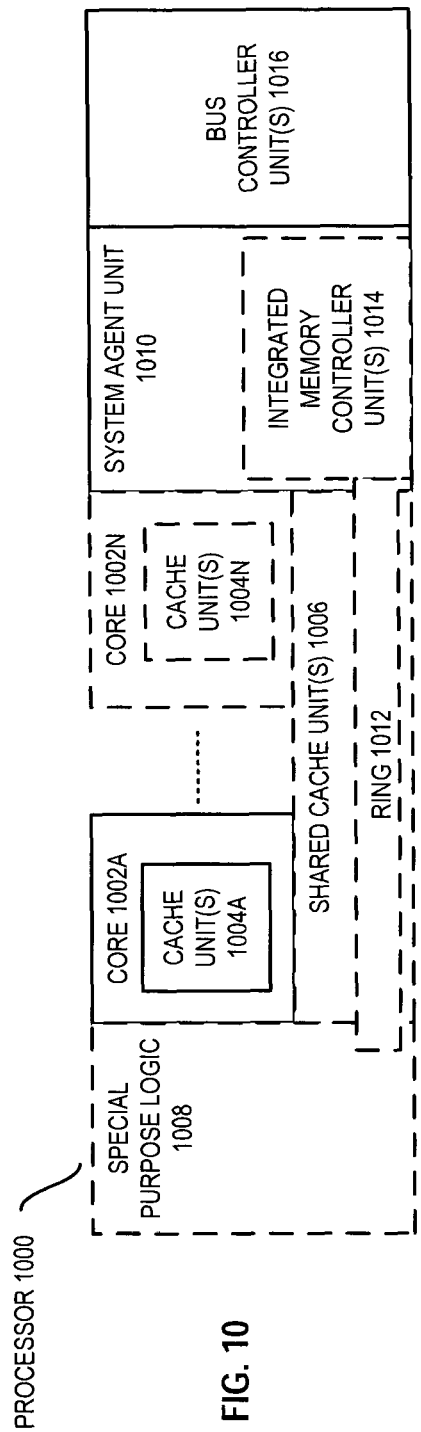
FIG. 10 is a block diagram of an embodiment of a processor that can have more than one core, an integrated memory controller, and/or integrated graphics.

FIG. 10 is a block diagram of an embodiment of a processor 1000 that can have more than one core, can have an integrated memory controller, and can have integrated graphics. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 can include: 1) a CPU with the special purpose logic 1008 being integrated graphics and/or scientific (throughput) logic (which can include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 can be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor can be implemented on one or more chips. The processor 1000 can be a part of and/or can be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 can include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments can use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 can include for example a power control unit (PCU) and a display unit. The PCU can be or include logic and components needed for regulating the power state of the cores 1002A-N and the integrated graphics logic 1008. The display unit is for driving one or more externally connected displays.

The cores 1002A-N can be homogenous or heterogeneous in terms of architecture instruction set; that is, two or more of the cores 1002A-N can be capable of execution the same instruction set, while others can be capable of executing only a subset of that instruction set or a different instruction set.

In one embodiment, a thermal sensor for a processor can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a variety of systems or electronic devices capable of incorporating a processor and/or other execution logic as disclosed herein are generally suitable.

Figure 11:
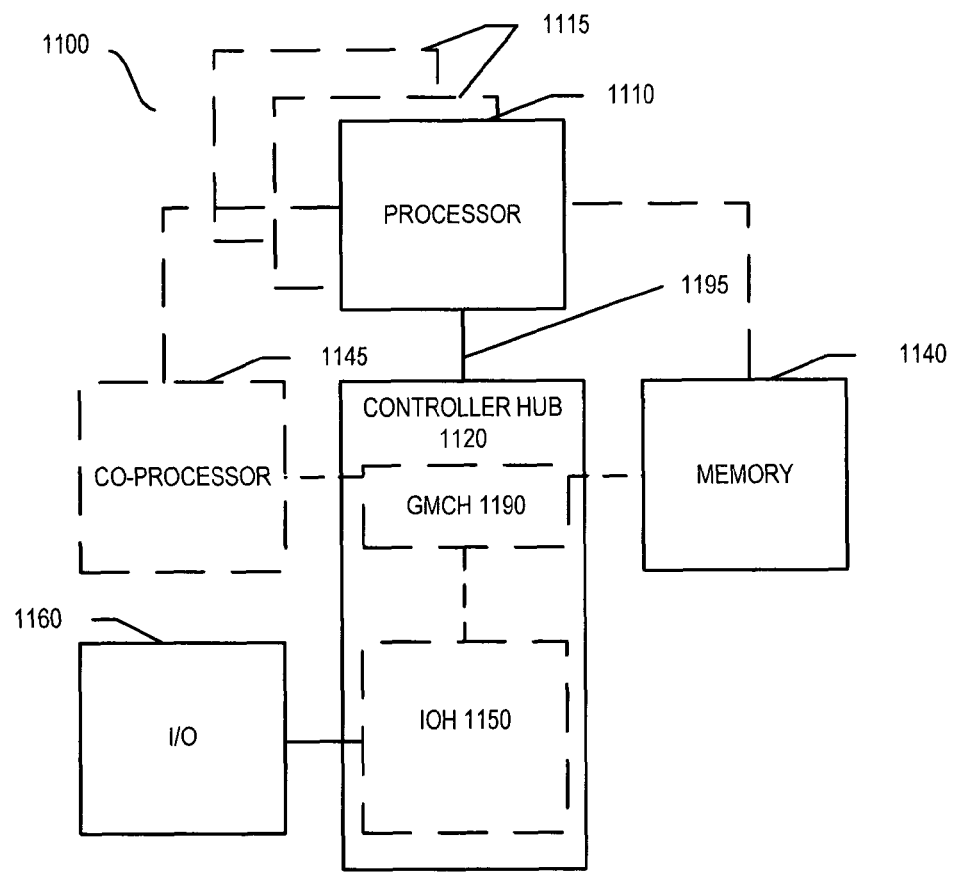
FIGS. 11-14 are block diagrams of exemplary computer architectures.

Referring now to FIG. 11, shown is a block diagram of an embodiment of a system 1100. The system 1100 can include one or more processors 1110, 1115, which are coupled to a controller hub 1120. In one embodiment the controller hub 1120 includes a graphics memory controller hub (GMCH) 1190 and an Input/Output Hub (IOH) 1150 (which can be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 can include one or more of the processing cores described herein and can be some version of the processor 1000.

The memory 1140 can be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 can include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions can be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

In one embodiment, a thermal sensor is associated with the processor, and can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

Figure 12:
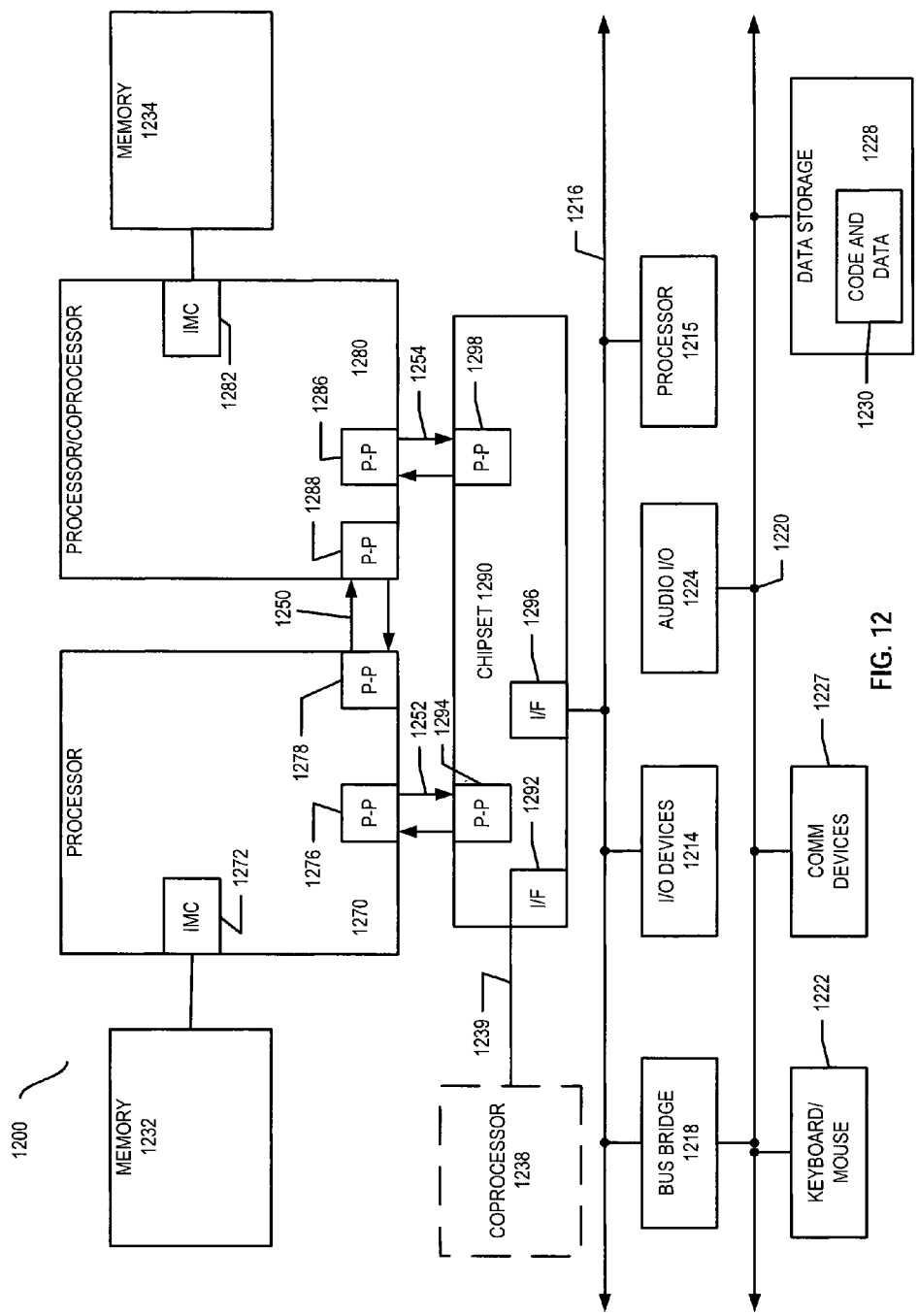

Referring now to FIG. 12, shown is a block diagram of an embodiment of a first more specific exemplary system 1200. As shown in FIG. 12, multiprocessor system 1200 is a point-to-point interconnect system, and includes a first processor 1270 and a second processor 1280 coupled via a point-to-point interconnect 1250. Each of processors 1270 and 1280 can be some version of the processor 1000. In one embodiment, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 can exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which can be portions of main memory locally attached to the respective processors.

Processors 1270, 1280 can each exchange information with a chipset 1290 via individual P-P interfaces 1252, 1254 using point to point interface circuits 1276, 1294, 1286, 1298. Chipset 1290 can optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) can be included in either processor or outside of both processors, yet connected with the processors via P-P interconnect, such that either or both processors' local cache information can be stored in the shared cache if a processor is placed into a low power mode.

Chipset 1290 can be coupled to a first bus 1216 via an interface 1296. In one embodiment, first bus 1216 can be a Peripheral Component Interconnect (PCI) bus, or a bus such as a PCI Express bus or another third generation I/O interconnect bus, but these are non-limiting examples.

As shown in FIG. 12, various I/O devices 1214 can be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 can be a low pin count (LPC) bus. Various devices can be coupled to a second bus 1220 including, for example, a keyboard and/or mouse 1222, communication devices 1227 and a storage unit 1228 such as a disk drive or other mass storage device which can include instructions/code and data 1230, in one embodiment. Further, an audio I/O 1224 can be coupled to the second bus 1220. Note that other architectures are possible. For example, instead of the point-to-point architecture of FIG. 12, a system can implement a multi-drop bus or other such architecture.

In one embodiment, a thermal sensor is associated with at least one processor, and can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

Figure 13:
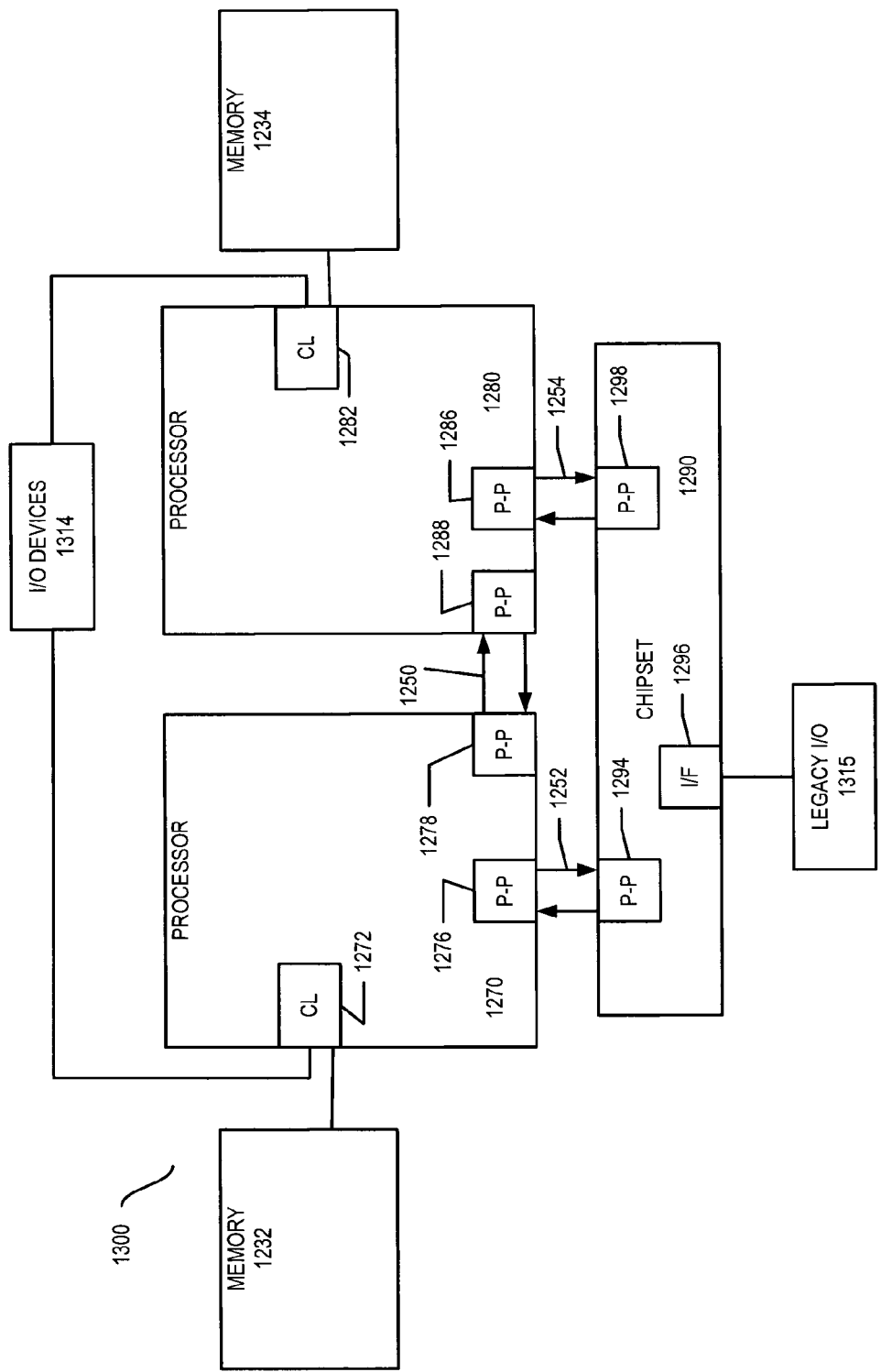

Referring now to FIG. 13, shown is a block diagram of an embodiment of a second more specific exemplary system 1300. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 can include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

In one embodiment, a thermal sensor is associated with at least one of the processors, and can be selectively put in a low power state. In the low power state some components are shut down, while others remain powered. Upon a wake trigger or event, the thermal sensor starts its thermal scan at the last-known value (prior to entering the low power state), and uses both coarse and fine-grained scanning to monitor the thermal state.

Figure 14:
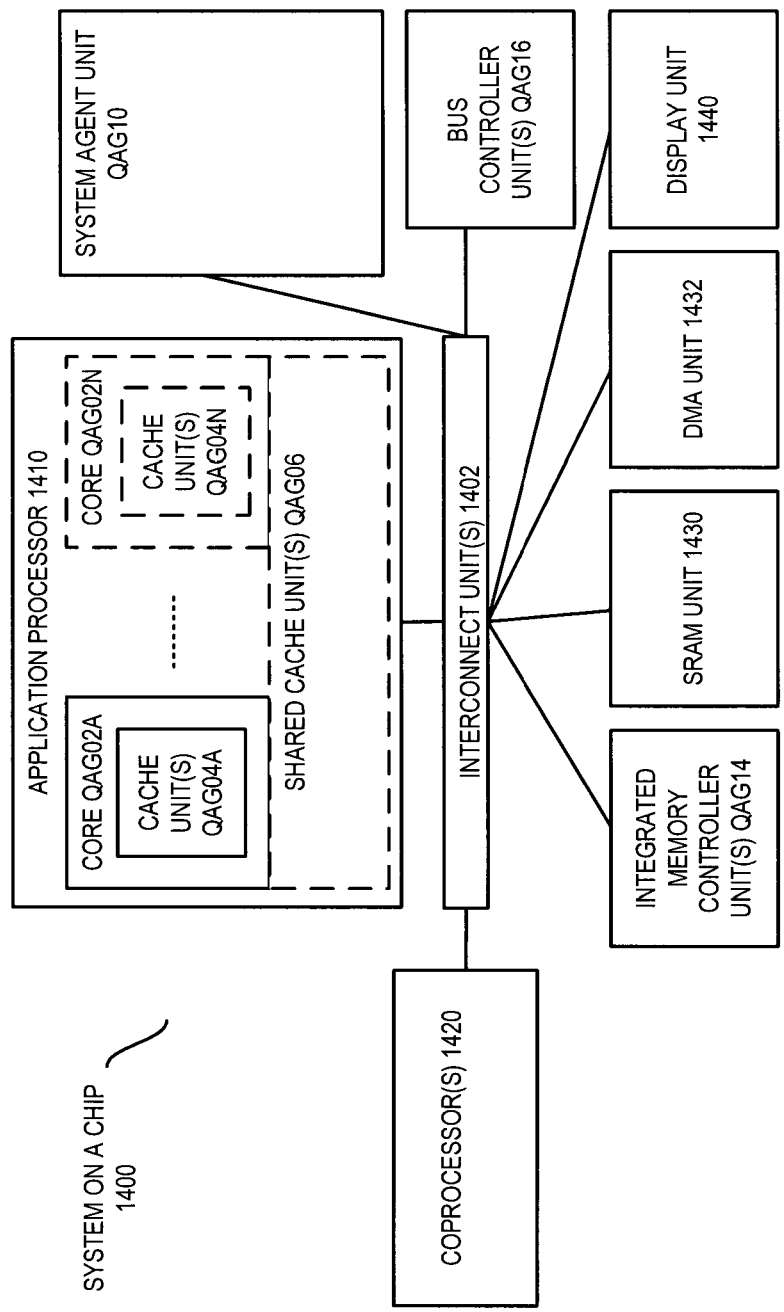

Referring now to FIG. 14, shown is a block diagram of an embodiment of a SoC 1400. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N and shared cache unit(s) 1006; a system agent unit 1010; a bus controller unit(s) 1016; an integrated memory controller unit(s) 1014; a set or one or more coprocessors 1420 which can include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Program code, such as code 1230 illustrated in FIG. 12, can be applied to input instructions to perform the functions described herein and generate output information. The output information can be applied to one or more output devices, in any known manner. For purposes of this application, a processing system includes any system that has a processor, such as, for example; a digital signal processor (DSP), a microcontroller, an application specific integrated circuit (ASIC), or a microprocessor.

The program code can be implemented in a high level procedural or object oriented programming language to communicate with a processing system. The program code can also be implemented in assembly or machine language, if desired. In fact, the mechanisms described herein are not limited in scope to any particular programming language. In any case, the language can be a compiled or interpreted language.

In some cases, an instruction converter can be used to convert an instruction from a source instruction set to a target instruction set. For example, the instruction converter can translate (e.g., using static binary translation, dynamic binary translation including dynamic compilation), morph, emulate, or otherwise convert an instruction to one or more other instructions to be processed by the core. The instruction converter can be implemented in software, hardware, firmware, or a combination thereof. The instruction converter can be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter can be implemented in software, firmware, hardware, or various combinations thereof. FIG. 15 shows a program in a high level language 1502 can be compiled using an x86 compiler 1504 to generate x86 binary code 1506 that can be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 can be compiled using an alternative instruction set compiler 1508 to generate alternative instruction set binary code 1510 that can be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that can be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for power saving comprising:
   placing a thermal sensor into a low power state;
   detecting a trigger to wake the thermal sensor from the low power state;
   accessing a value indicating a measured state of the thermal sensor saved prior to the thermal sensor entering the low power state;
   adjusting the value by steps of n counting in a direction toward a target value, n being greater than 1, until an inflection point is reached, the inflection point indicating the value has passed the target value; and
   in response to reaching the inflection point, adjusting the value in an opposite direction toward the target value,
   wherein in response to waking, the thermal sensor performs accessing a value indicating a last measured state of the thermal sensor prior to the thermal sensor entering the low power state, adjusting the value with a fast count by adjustments of n counting in a direction toward a target value, n being greater than 1, until detection of an inflection point, the inflection point indicating the value has passed the target value, and in response to the inflection point detection, adjusting the value with a normal count by adjustments of 1 counting in an opposite direction toward the target value.

2. The method of claim 1, wherein adjusting the value comprises incrementing the value.

3. The method of claim 1, wherein adjusting the value comprises decrementing the value.

4. The method of claim 1, wherein adjusting the value toward a target value comprises adjusting the value to a value that corresponds to an actual temperature of a system measured by the thermal sensor.

5. The method of claim 1, wherein adjusting the value comprises adjusting the value in accordance with different states of a state machine, wherein the inflection point triggers a state change.

6. The method of claim 1, wherein accessing the value further comprises:
   reading a comparator to determine the direction of counting toward the target value.

7. The method of claim 1, wherein adjusting the value with the normal count in the second direction comprises adjusting the value until detection of a subsequent inflection point, the subsequent inflection point indicating that the value has passed the target value from the second direction; and further comprising:
   continuing to adjust the value with the normal count until the value dithers around the target value.

8. An article of manufacture comprising a non-transitory computer-readable storage medium having content stored thereon, which when executed causes a device to perform operations including:
   detecting a trigger to wake a thermal sensor from a low power state;
   accessing a value indicating a measured state of the thermal sensor saved in a register prior to the thermal sensor entering the low power state;
   adjusting the value with a fast count by adjustments of n counting in a direction toward a target value, n being greater than 1, until detection of an inflection point, the inflection point indicating the value has passed the target value; and
   in response to the inflection point detection, adjusting the value with a normal count by adjustments of 1 counting in an opposite direction toward the target value.

9. The article of manufacture of claim 8, wherein the content for adjusting the value comprises content for incrementing or decrementing the value.

10. The article of manufacture of claim 8, wherein the content for adjusting the value with a fast count and adjusting the value with a normal count comprises content for adjusting the value in accordance with different states of a state machine, wherein the inflection point triggers a state change.

11. The article of manufacture of claim 8, wherein the content for accessing the value further comprises content for:
    reading a comparator to determine the direction of counting toward the target value.

12. The article of manufacture of claim 8, wherein the content for adjusting the value with the normal count in the second direction comprises content for adjusting the value until detection of a subsequent inflection point, the subsequent inflection point indicating that the value has passed the target value from the second direction; and
further comprising content for:
- continuing to adjust the value with the normal count until the value dithers around the target value.

13. A circuit comprising:
- a thermal sensor including a first portion of thermal sensor components to be placed into a low power state and a second portion of thermal sensor components to remain powered in the low power state; and
- power management to put the thermal sensor into the low power state, including selectively shutting down the first portion of thermal sensor components, and to wake the thermal sensor in response to a trigger;
- wherein in response to waking, the thermal sensor to access a value indicating a last measured state of the thermal sensor prior to the thermal sensor entering the low power state, adjust the value with a fast count by adjustments of n counting in a direction toward a target value, n being greater than 1, until detection of an inflection point, the inflection point indicating the value has passed the target value, and in response to the inflection point detection, adjust the value with a normal count by adjustments of 1 counting in an opposite direction toward the target value.

14. The circuit of claim 13, wherein the first portion of thermal sensor components includes a comparator, the thermal sensor to read the comparator to determine the direction of counting toward the target value upon waking.

15. The circuit of claim 13, wherein the second portion of thermal sensor components includes a register to store the value indicating the last measured state.

16. The circuit of claim 13, wherein the second portion of thermal sensor components includes a state machine, wherein the thermal sensor is to adjust the value with a fast count and adjust the value with a normal count in accordance with different states of the state machine, wherein the inflection point triggers a state change.

17. The circuit of claim 13, wherein the thermal sensor is to adjust the value until detection of a subsequent inflection point, the subsequent inflection point indicating that the value has passed the target value from the second direction, and is to continue to adjust the value with the normal count until the value dithers around the target value.

18. A system comprising:
- a processor to execute instructions, the processor to selectively enter and wake from a low power state;
- a circuit coupled to the processor to monitor thermal operation of the processor, the circuit including
  - a thermal sensor including a first portion of thermal sensor components to be shut down in a low power state and a second portion of thermal sensor components to remain powered in the low power state; and
  - power management to put the thermal sensor in the low power state, including selectively shutting down the first portion of thermal sensor components, and to wake the thermal sensor in response to a trigger;
  - wherein in response to waking, the thermal sensor to access a value indicating a last measured state of the thermal sensor prior to the thermal sensor entering the low power state, adjust the value with a fast count by adjustments of n counting in a direction toward a target value, n being greater than 1, until detection of an inflection point, the inflection point indicating the value has passed the target value, and in response to the inflection point detection, adjust the value with a normal count by adjustments of 1 counting in an opposite direction toward the target value; and
- a hardware controller to manage a touchscreen interface device to receive input/output (I/O) to be processed by the processor.

19. The system of claim 18, wherein the first portion of thermal sensor components includes a comparator, the thermal sensor to read the comparator to determine the direction of counting toward the target value upon waking.

20. The system of claim 18, wherein the second portion of thermal sensor components includes a state machine, wherein the thermal sensor is to adjust the value with a fast count and adjust the value with a normal count in accordance with different states of the state machine, wherein the inflection point triggers a state change.

21. The system of claim 18, wherein the thermal sensor is to adjust the value until detection of a subsequent inflection point, the subsequent inflection point indicating that the value has passed the target value from the second direction, and is to continue to adjust the value with the normal count until the value dithers around the target value.

* * * * *